(12) United States Patent
Waibel et al.

(10) Patent No.: US 10,577,693 B2
(45) Date of Patent: Mar. 3, 2020

(54) MULTILAYER COATING

(71) Applicant: Liebherr-Aerospace Lindenberg GmbH, Lindenberg/Allgäu (DE)

(72) Inventors: Christof Waibel, Schwend (DE); Benjamin Kröger, Ravensburg (DE)

(73) Assignee: Liebherr-Aerospace Lindenberg GmbH, Lindenberg/Allgäu (DE)

( * ) Notice: Subject to any disclaimer, the term of this patent is extended or adjusted under 35 U.S.C. 154(b) by 32 days.

(21) Appl. No.: 15/141,958

(22) Filed: Apr. 29, 2016

(65) Prior Publication Data

US 2016/0319435 A1   Nov. 3, 2016

(30) Foreign Application Priority Data

Apr. 30, 2015   (DE) .......................... 10 2015 005 625

(51) Int. Cl.
*C23C 22/50*   (2006.01)
*C23C 22/82*   (2006.01)
(Continued)

(52) U.S. Cl.
CPC .............. *C23C 22/50* (2013.01); *B05D 5/067* (2013.01); *B05D 7/14* (2013.01); *B32B 15/015* (2013.01); *C09D 5/08* (2013.01); *C09D 5/103* (2013.01); *C09D 5/106* (2013.01); *C21D 6/00* (2013.01); *C21D 7/06* (2013.01); *C21D 9/0068* (2013.01);
(Continued)

(58) Field of Classification Search
CPC ..... C23C 28/00; C23C 28/021; C23C 28/321; C23C 22/00; C23C 22/24; C23C 22/50; C23C 22/73; C23C 22/74; C23C 22/78; C23C 22/82; C23C 28/34; C21D 7/06;
(Continued)

(56) References Cited

U.S. PATENT DOCUMENTS 3,909,953 A * 10/1975 Hemsath ................. F23G 7/065
                                                          34/450
4,537,837 A *  8/1985 Gunn ...................... C23C 22/74
                                                          428/621
(Continued)

FOREIGN PATENT DOCUMENTS

| DE | 3522802 A | 1/1986 |
| DE | 102010017354 A | 12/2011 |
| EP | 2290133 A | 3/2011 |
| FR | 2851680 A | 8/2004 |
| WO | WO-2008025498 A1 * | 3/2008 ............... B05C 3/04 |

OTHER PUBLICATIONS

ASTM B849-94 (1994).*
(Continued)

*Primary Examiner* — Kregg T Brooks
(74) *Attorney, Agent, or Firm* — Arent Fox LLP

(57) ABSTRACT

A multilayer coating obtained by carrying out the steps of (1) applying a ZnNi layer to a substrate material, in particular to a steel; (2) carrying out a first heat treatment in a temperature range from 135-300° C., preferably from 185-220° C., for a time period of at least 4 hours, preferentially of at least 23 hours; (3) applying a metal-pigmented top coat to the ZnNi layer; and (4) carrying out a second heat treatment in a temperature range from 150-250° C., preferably from 180-200° C., for a time period of at least 10 minutes, prefer-ably of at least 20 minutes, preferentially of at least 30 minutes.

3 Claims, 12 Drawing Sheets

(51) Int. Cl.

| | | |
|---|---|---|
| C23C 22/24 | (2006.01) | |
| C09D 5/08 | (2006.01) | |
| B05D 7/14 | (2006.01) | |
| C23C 22/74 | (2006.01) | |
| C23C 28/00 | (2006.01) | |
| B05D 5/06 | (2006.01) | |
| C09D 5/10 | (2006.01) | |
| B32B 15/01 | (2006.01) | |
| C21D 6/00 | (2006.01) | |
| C21D 7/06 | (2006.01) | |
| C21D 9/00 | (2006.01) | |
| C23C 22/73 | (2006.01) | |
| C23C 22/78 | (2006.01) | |
| C23C 26/00 | (2006.01) | |
| B05D 3/02 | (2006.01) | |

(52) U.S. Cl.
CPC ............. *C23C 22/24* (2013.01); *C23C 22/73* (2013.01); *C23C 22/74* (2013.01); *C23C 22/78* (2013.01); *C23C 22/82* (2013.01); *C23C 26/00* (2013.01); *C23C 28/00* (2013.01); *C23C 28/321* (2013.01); *C23C 28/34* (2013.01); *B05D 3/0254* (2013.01); *B05D 2202/10* (2013.01); *B05D 2350/65* (2013.01)

(58) Field of Classification Search
CPC .......... C21D 6/00; C09D 5/103; C09D 5/106; B32B 15/16; B32B 15/015
See application file for complete search history.

(56) References Cited

U.S. PATENT DOCUMENTS

| | | | | |
|---|---|---|---|---|
| 4,670,354 | A | 6/1987 | Polard et al. | |
| 4,765,871 | A * | 8/1988 | Hsu | C25D 3/565 205/246 |
| 4,910,097 | A * | 3/1990 | Nomura | B05D 7/51 427/388.4 |
| 6,189,356 | B1 * | 2/2001 | Simeone | B24C 1/04 29/90.7 |
| 6,586,117 | B2 * | 7/2003 | Nomura | C21D 8/0226 148/333 |
| 7,514,153 | B1 * | 4/2009 | Archer, Jr. | C23C 28/00 428/623 |
| 2004/0003996 | A1 * | 1/2004 | Anderson | C09D 5/4453 204/499 |
| 2004/0163740 | A1 | 8/2004 | Keener et al. | |
| 2008/0131721 | A1 * | 6/2008 | Tran | C25D 3/565 428/613 |
| 2010/0285226 | A1 * | 11/2010 | Suzuki | C09D 7/70 427/383.7 |
| 2012/0164472 | A1 | 6/2012 | Kuhn et al. | |
| 2013/0206284 | A1 | 8/2013 | Norden et al. | |

OTHER PUBLICATIONS

Partial machine translation of WO-2008025498-A1.*
David Kirk, "Principles of Almen Strip Selection," The Shot Peener, pp. 24-32, Winter 2013.*
ASTM International, ASTM B 850-98 (Year: 2015).*

* cited by examiner

Time-to-rupture diagrams

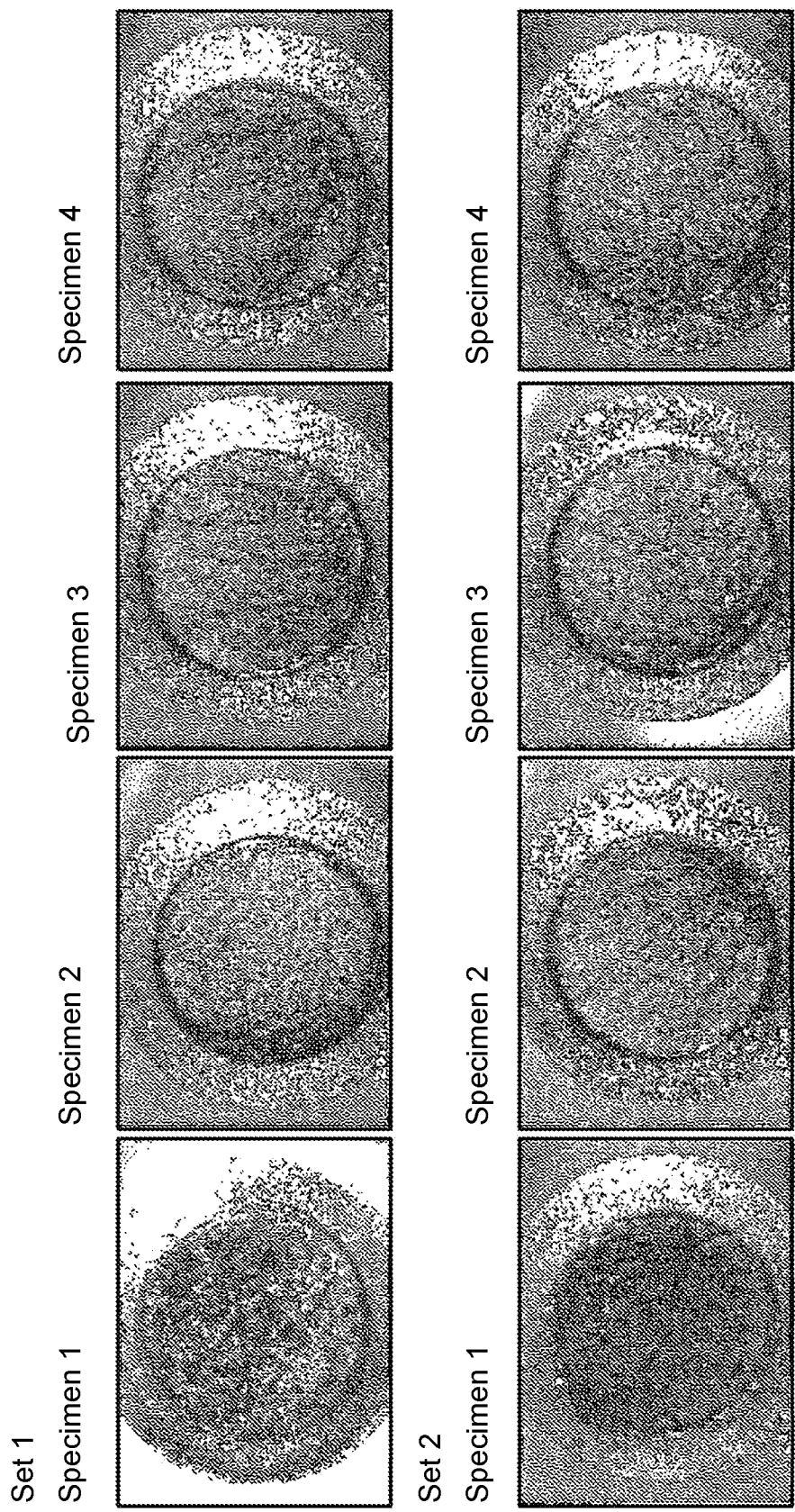

Time-to-rupture diagram

Ruptured surface / microscopy

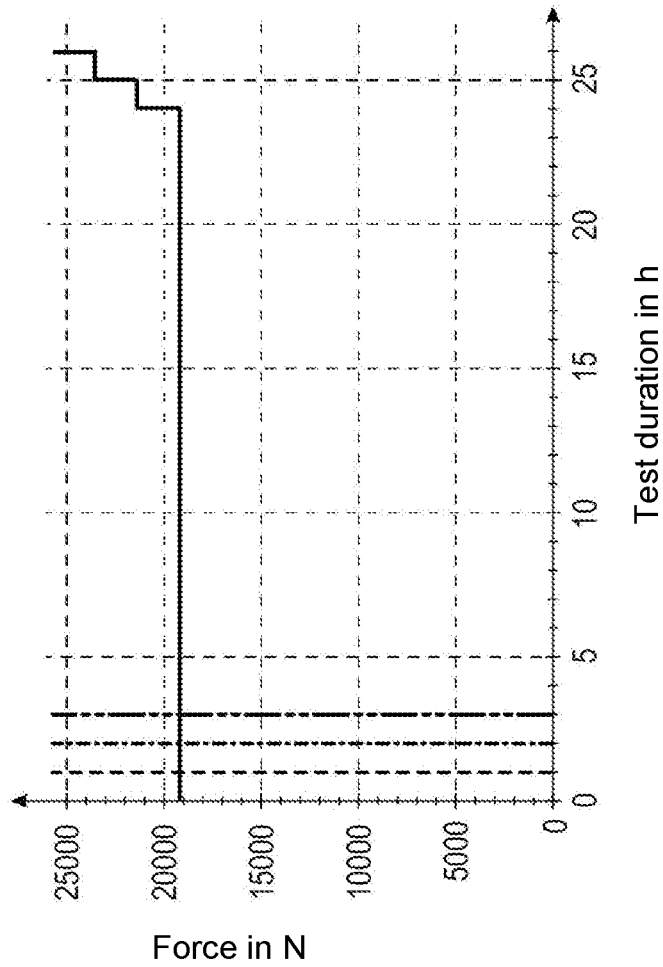
FIG. 4a Time-to-rupture diagram
Set 1 / Specimens 1 - 4

Ruptured surface / microscopy
Set 1

MULTILAYER COATING

CROSS-REFERENCE TO RELATED APPLICATIONS

The present application claims priority to German Patent Application No. 10 2015 005 625.5, filed Apr. 30, 2015, the entire contents of which are incorporated herein by reference.

FIELD OF THE INVENTION

The present invention relates to a multilayer coating and to a manufacturing method for said multilayer coating.

BACKGROUND OF THE INVENTION

Hydrogen re-embrittlement of coated steel can result in a considerable deterioration of the properties of coated steel. A deposition of individual hydrogen atoms in the lattice structure of the steel in this respect effects an increase in the pressure in the lattice matrix and results in a disadvantageous change in the steel brittleness. A hydrogen-induced crack formation of the steel can consequently result in this respect, whereby the properties with respect to strength associated with a steel in a normal case can no longer be maintained. Such a crack formation would in particular bring about devastating consequences in the field of aeronautics in which major components such as the main undercarriage, the transmission or bolts are produced from steel.

A re-embrittlement of a coated high-strength steel typically occurs as a result of corrosion. Atomic hydrogen is created in this respect at the surface of the high-strength steel and/or the coating, either by hydrogen corrosion or by a different chemical reaction. The atomic hydrogen partly diffuses into the material (=steel) before a combination into a non-diffusible $H_2$ molecule takes place. The atomic hydrogen diffused into the material is deposited at lattice defects in the lattice structure of the steel and results in an embrittlement of the steel such that a brittle crack or a brittle fracture can occur due to the pressure increase associated therewith in the interior of the steel.

SUMMARY OF THE INVENTION

It is the object of the present invention to provide a multilayer coating which can be applied to a substrate, preferably steel, and which has a particularly pronounced corrosion resistance as well as resistance associated therewith against a hydrogen re-embrittlement. A usability of the components coated with the multilayer coating in accordance with the invention can thus be provided for a longer time period without any impairment taking place due to hydrogen re-embrittlement which may be possible.

This object is satisfied by a multilayer coating in accordance with claim 1. The multilayer coating in accordance with the invention is accordingly obtained by the steps: applying a ZnNi layer (=zinc-nickel layer) to a substrate material, in particular to a steel or to a high-strength steel; carrying out a first heat treatment in a temperature range from 135° C. to 300° C., preferably from 185° C. to 220° C., for a time period of at least four hours, preferably of at least 23 hours; applying at least one metal-pigmented top coat to the ZnNi layer; and carrying out a heat treatment in a temperature range from 150° C. to 250° C., preferably from 180° C. to 200°, for a time period of at least 10 minutes, preferably of at least 20 minutes, more preferably of at least 30 minutes. It is to be preferred in this respect that the above-shown steps for obtaining the multilayer coating are carried out in the given order.

An LHE ZnNi, that is a low hydrogen embrittlement ZnNi, is preferably used as the ZnNi layer which is applied to the substrate material. A high-strength steel such as 300 M or AIS I 4340 can be used as the substrate material for the ZnNi layer.

The metal-pigmented top coat or top coats preferably has/have an organic or inorganic matrix or binding matrix, with an organic binding matrix being preferred.

After carrying out the heat treatment, which also has the purpose of outgassing any hydrogen atoms which have been produced on the application of the ZnNi layer to the substrate material, one (or more) metal-pigmented top coats are applied to the ZnNi layer. The metal-pigmented top coat or top coats preferably comprise(s) a mixture of zinc flake layers and aluminum flake layers which are connected by an inorganic or organic matrix. The layer can be applied by a spray application or by a dip spin process. The application of the metal-pigmented top coat preferably takes place at room temperature, at a humidity of 30 to 80% RH.

A second heat treatment is subsequently carried out which serves to bake in the metal-pigmented top coat. In this respect, an air-circulation furnace can be used which is regulated such that the surface temperature of the top coat is preferably in a temperature range from 150 to 250° C., preferably from 180° to 200° C. The duration of the heat treatment is at least 10 minutes, preferably at least 20 minutes, more preferably at least 30 minutes.

The result is a multilayer coating which provides exceptional corrosion protection. The metal-pigmented top coat is in this respect porous or diffusion-open so that the multilayer coating is electrochemically active. The cathodic protection is thus maintained. In addition the corrosion current $i_{corr}$ is preferably less than 5 µA/cm².

The adhesion of the multilayer coating is greater than 4 N/mm² on an application to a high-strength steel in a butt-joint test and has only isolated cohesive failure.

In addition, the multilayer coating effects a reduction of the corrosion rate of the ZnNi layer. A reduction of the corrosion rate also results in comparison with an uncoated or varnished variant of a ZnNi layer applied to a substrate material. It is particularly advantageous that the multilayer coating practically inhibits hydrogen embrittlement on a corrosion load. The behavior is therefore better with respect to corrosion-caused, hydrogen-induced damage than just a coating of a substrate material, for example a steel or high-strength steel, with an LHE ZnNi.

The thickness of the ZnNi layer of the multilayer coating in accordance with the invention is preferably at most 30 µm thick, preferably at most 20 µm thick. The organic proportion is less than 100 milligrams per liter.

It is likewise advantageous if the dry layer thickness of the metal-pigmented top coat or top coats amounts to at most 10 µm, preferably at most 7 µm, more preferably at most 5 µm. In this respect, the dry layer thickness of the top coat is determined after the second heat treatment.

A further optional feature of the present invention is that a substrate material is shot peened with an intensity of at most 0.1 mm Almen A before an application of a ZnNi layer to the substrate material. The shot peening of the substrate material can take place, for example using white fused alumina F180 (=EFK180).

The Almen intensity measurement represents a possibility of comparing different shot peening processes. In this respect, the deformation is determined which the shot peening process causes at a defined specimen. The indication 0.1 mm Almen A shows that a test strip of type A, which has a thickness of 1.29 mm, has been used for the intensity measurement. If this strip is subjected to the shot peening process, it has a bending deformation at its saturation point (doubling of the shot peening duration only produces a 10% increase in a deflection) of 0.1 mm. Since the measurement using the Almen intensity measurement is known in the prior art, this process will not be looked at in any further detail. The effect of the shot peening is that the substrate material or the steel is liberated from any contaminants.

It is furthermore possible to passivate the ZnNi layer before an application of the metal-pigmented top coat. The passivation can take place before or after the first heat treatment and can be carried out with chromium (VI) or without chromium (VI).

A flash-off time of at least 5 minutes, preferably at least 10 minutes, more preferably at least 20 minutes, can furthermore be provided after the application of the metal-pigmented top coat and before the carrying out of the second heat treatment.

Furthermore, the present invention relates to a method for manufacturing a multilayer coating on a substrate material, in particular a steel, in which a ZnNi layer is applied to the substrate material; a first heat treatment is carried out in a temperature range from 135 to 300° C., preferably from 185 to 220° C., for a time period of at least 4 hours, preferably of at least 23 hours; at least one metal-pigmented top coat is applied to the ZnNi layer; and a second heat treatment is carried out in a temperature range from 150 to 250° C., preferably from 180° to 200°, for a time period of at least 10 minutes, preferably of at least 20 minutes, more preferably of at least 30 minutes.

The metal-pigmented top coat or top coats preferably has/have an organic or inorganic matrix or binding matrix, with an organic binding matrix being preferred.

The substrate material is preferably shot peened with an intensity of at most 0.1 mm Almen A before an application of a ZnNi layer to the substrate material. This results in a cleaning of the substrate material so that a deposition of a ZnNi layer can be effectively carried out on the substrate material.

A passivation of the ZnNi layer can furthermore take place before or after the first heat treatment. The passivation can in this respect be carried out with or without chromium (VI).

A flash-off time of at least 5 minutes, preferably of at least 10 minutes, more preferably of at least 20 minutes, is preferably provided after the application of the metal-pigmented top coat.

The present invention furthermore relates to a component in an aircraft, in particular a main undercarriage, a push rod, a transmission or a bolt, which is provided with a multilayer coating in accordance with the present disclosure and/or which has been manufactured by a method in accordance with the present disclosure.

BRIEF DESCRIPTION OF THE DRAWINGS

The invention will be described in more detail in the following with reference to the enclosed Figures. In this respect, a number of the Figures are related to a series of experiments which have been carried out and which show the advantages of the multilayer coating in accordance with the invention. There are shown:

FIGS. 2a-c a time-to-rupture diagram, an enlarged shot of a ruptured surface and an REM shot of a ruptured surface of a steel coated with the multilayer coating in accordance with the invention;

FIGS. 4a-c a time-to-rupture diagram, an enlarged shot of a ruptured surface and an REM shot of a ruptured surface of a steel coated with the conventional ZnNi layer.

DETAILED DESCRIPTION OF THE PREFERRED EMBODIMENTS

Figure 1:
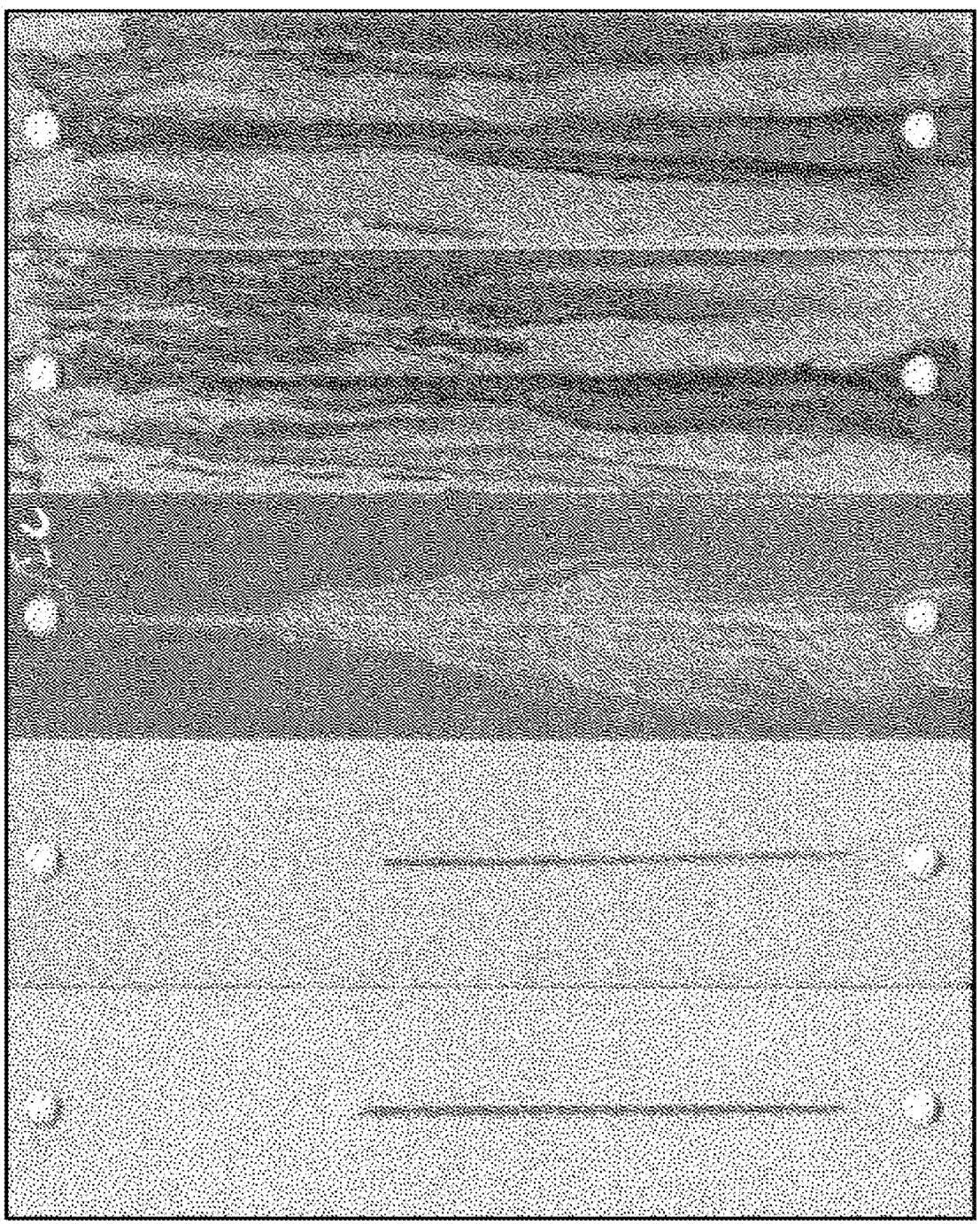
FIG. 1 a comparison of the corrosion resistance of the coating in accordance with the invention with respect to conventional coatings.

A total of 5 different strips can be recognized in FIG. 1, with the two left hand strips showing a multilayer coating in accordance with the invention on a steel. The strip arranged in the middle shows a steel which has only been coated with a ZnNi layer and the two right hand strips show a steel which has only been coated with a metal-pigmented top coat, but does not have a ZnNi layer.

The coatings shown in FIG. 1 were all subjected to an identical corrosion test so that now the corrosion resistance of the different coatings can be assessed using an optical examination. It can immediately be recognized that the multilayer coating in accordance with the invention has a very much better corrosion resistance than the coating not in accordance with the invention likewise shown in FIG. 1. Almost no traces of corrosion can be recognized. The two right hand strips which do not have a zinc-nickel layer have in particular been very pronouncedly attacked by corrosion. The strip of a steel coated with a zink-nickel layer arranged at the middle has a somewhat less advanced corrosion state.

This result is confirmed since in a re-embrittlement experiment in accordance with NAVAL Warfare (45%/24h+ 5%/1 h) the behavior of the multilayer coating in accordance with the invention on a steel, in particular on a high-strength steel, is better with respect to corrosion-caused, hydrogen-induced damage than a steel having an LHE ZnNi layer.

The total impression that the multilayer coating in accordance with the invention is superior to a conventional ZnNi layer is also confirmed on the basis of the series of experiments shown in the following.

In this respect, incremental-step load tests are carried out under a media load in 3.5% NaCl solution at room temperature on nick-break specimens from the material 300 M with different coating variants in accordance with ASTM F519. After the examination, a ruptured surface analysis takes place for determining operationally-caused, hydrogen-induced damage due to the corrosion load (re-embrittlement tests).

The series of experiments comprises the following specimens in total:

2 sets @ 4 nick-break specimens, Number: 1a, in the state: LHE ZnNi (LLI)+passivation+HT 190° C./23 h+TC P35 (5 μm)+HT 190° C./30 min (in accordance with the invention)

2 sets @ 4 nick-break specimens, Number: 1 b, in the state: LHE ZnNi (LLI)+passivation+HT 190° C./23 h+TC P35 (10 μm)+HT 190° C./30 min (in accordance with the invention)

1 set @ 4 nick-break specimens, Number: 1c, in the state: LHE ZnNi (LU)+passivation+HT 190° C./23 h (comparison example)

The orienting re-embrittlement tests are carried in accordance with the test routine shown below.

Test routine—Re-embrittlement tests

TABLE 1

Test routine - Re-embrittlement tests

| | |
|---|---|
| Pre-load | Passed embrittlement test |
| Incremental, step-wise load (incremental-step load) | 45% $F_{mK}$ for 24 hours Subsequently hourly increase by 5% $F_{mK}$ |
| Test duration | Max. 24 + 10 hours |
| Temperature | Room temperature (20 ± 3° C.) |
| Test medium | 175 ± 2 ml 3.5% NaCl solution, pH 6.9 ± 0.1 not purged with nitrogen, naturally vented |

Ia—LHE ZnNi (LLI)+Passivation+HT 190° C./23 h+TC P35 (5 μm)+HT 190° C./30 min

Two sets each having 4 nick-break specimens are prepared in this specimen. In this respect, an LHE ZnNi (LLI) having a passivation is used as the zinc-nickel layer and is subjected to a first heat treatment at 190° for a time of 23 hours. For this purpose a top coat (=coating) of the type P35 from the Magni corporation is used as the metal-pigmented top coat. It is applied with a thickness of 5 μm. Subsequently a second heat treatment is carried out which has the purpose of baking in the metal-pigmented top coat. The second heat treatment at 190° C. lasts 30 minutes. This can be summarized as follows in brief: LHE ZnNi (LLI)+passivation+HT 190° C./23 h+TC P35 (5 μm)+HT 190° C./30 min.

A steel of the type 300 M, Lot 065/Z ($F_{mk}$=42960 N) is used as the material which serves as the substrate material for the multilayer coating.

The test parameters are as follows: 45% $F_{mK}$ 24 h+5% $F_{mK}$ per 1 h; max. 24+10 hours; test medium 3.5% NaCl, pH 7; test bench: Zwick Z050.

TABLE 2

Result of the test on specimen Ia
Results

| Set | Specimen | Time to rupture in hours | Max. force in % $F_{mK}$/N | Result (>50% passed) | Remark |
|---|---|---|---|---|---|
| 1 | 1 | 33:00:36 | 90/40500 | Passed | — |
| | 2 | 33:01:12 | 90/40500 | Passed | — |
| | 3 | 33:01:48 | 90/40500 | Passed | — |
| | 4 | 33:02:24 | 90/40500 | Passed | — |
| 2 | 1 | 33.00:36 | 90/40800 | Passed | — |
| | 2 | 33:01:12 | 90/40800 | Passed | — |
| | 3 | 33:01:48 | 90/40800 | Passed | — |
| | 4 | 33:01:48 | 90/40800 | Passed | — |

Figure 2A:
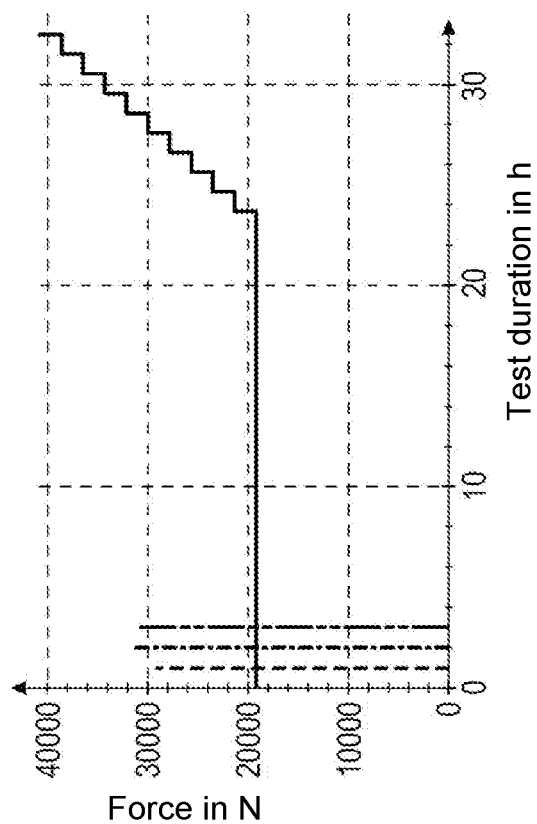
Figure 2A:
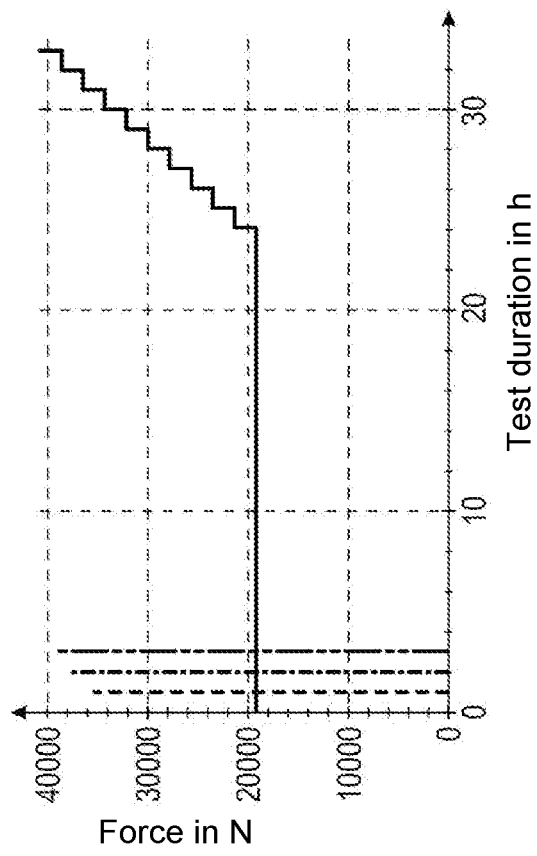

The time-to-rupture diagrams of one of the specimens 1-4 from set 1 and from set 2 are shown in FIG. 2a.

Furthermore, a microscopic representation of the ruptured surfaces of each specimen is shown in FIG. 2b.

Figure 2C:
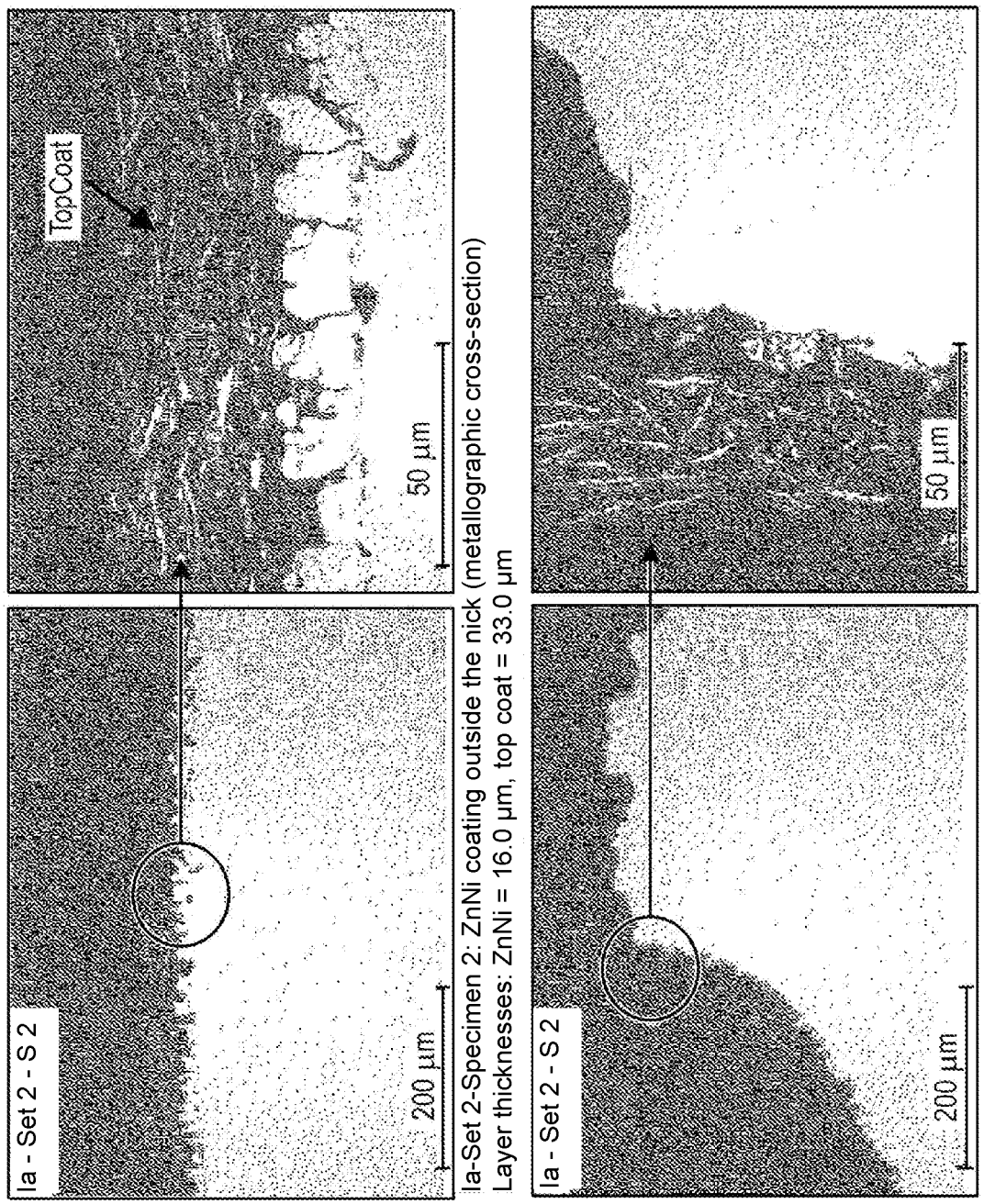

FIG. 2c shows 4 representations of a specimen in which enlarged shots of the layer thicknesses in the nick bed of the nick-break specimen and outside the nick can be seen.

The incremental-step load tests show that both examined sets @ 4 specimens withstood a test load of 90% $F_{mK}$. The shortest test duration amounts to 33h 36 s in both sets. The metallographic analyses of variant la show that the ZnNi coating is continuously present at the examined specimen. The layer thickness of the metal-pigmented top coat (ZnL layer) amounts to an average of 16.0 μm. The layer thickness of the top coat amounts to approximately 33.0 μm (FIG. 2c, top illustration). The ZnNi coating has a thickness of 8.5 μm in the nick bed and the top coat has a thickness of 20.5 μm (FIG. 2c, lower illustrations).

The metallographic analyses of variant 1a show that the ZnNi coating is continuously present at the examined specimen. The layer thickness of the ZnNi coating amounts to 16.0 μm on average. The layer thickness of the top coat amounts to approximately 33.0 μm (FIG. 2c, top illustrations). The ZnNi coating has a thickness of 8.5 mm in the nick bed and the top coat has a thickness of 20.5 μm (FIG. 2c, lower illustrations).

Ib—LHE ZnNi (LLI)+Passivation+HT 190° C./23 h+TC P35 (10 μm) +HT 190° C./30 min

Two sets each having 4 nick-break specimens are prepared in this specimen. In this respect, an LHE ZnNi (LLI) having a passivation is used as the zinc-nickel layer and is subjected to a first heat treatment at 190° for a time of 23 hours. For this purpose a top coat (TC) of the type P35 from the Magni corporation is used as the metal-pigmented top coat. It is applied with a thickness of 10 μm. Subsequently a second heat treatment is carried out which inter alia has the purpose of baking in the metal-pigmented top coat. The second heat treatment at 190° C. lasts 30 minutes. This can be summarized as follows in brief: LHE ZnNi (LLI)+passivation+HT 190° C./23 h+TC P35 (10 μm)+HT 190° C./30 min.

A steel of the type 300 M, Lot 065/Z ($F_{mk}$=42960 N) is used as the material which serves as the substrate material for the multilayer coating.

The test parameters are as follows: 45% $F_{mK}$ 24 h+5% $F_{mK}$ per 1 h; max. 24+10 hours; test medium 3.5% NaCl, pH 7; test bench: Zwick Z050.

TABLE 3

Result of the test on specimen Ib
Results

| Set | Specimen | Time to rupture in hours | Max. force in % $F_{mK}$/N | Result (>50% passed) | Remark |
|---|---|---|---|---|---|
| 1 | 1 | 33:00:36 | 90/40600 | Passed | — |
| | 2 | 33:01:12 | 90/40600 | Passed | — |
| | 3 | 33:01:48 | 90/40600 | Passed | — |
| | 4 | 33:02:24 | 90/40600 | Passed | — |
| 2 | 1 | 26:08:24 | 55/25800 | Passed | — |
| | 2 | 26:09:00 | 55/25800 | Passed | — |
| | 3 | 26:09:42 | 55/25800 | Passed | — |
| | 4 | 26:10:30 | 55/25800 | Passed | — |

The time-to-rupture diagrams of one of the specimens 1-4 from set 1 and from set 2 are shown in FIG. 2a.

Furthermore, a microscopic representation of the ruptured surfaces of each specimen is shown in FIG. 2b.

The incremental-step load tests show that the two examined specimen sets withstood considerably different test loads. That is, the four specimens of set 1 withstood a test load of 90% $F_{mK}$; those of set 2 only 55% $F_{mK}$. The shortest test duration in set one is 33 h 36 s and in set two 26 h 8 min 24 s.

Figure 3A:
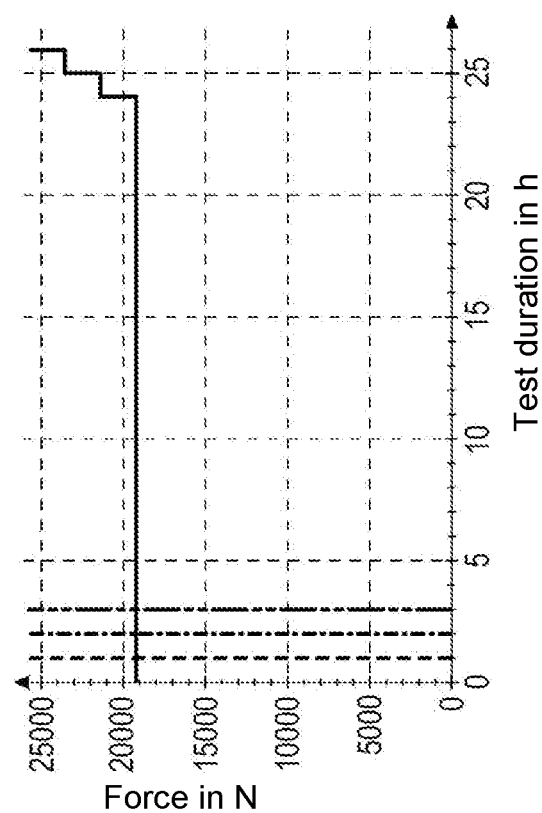
FIGS. 3a-e a time-to-rupture diagram, an enlarged shot of a ruptured surface and two REM shots of a ruptured surface of a steel coated with the multilayer coating in accordance with the invention.
Figure 3A:
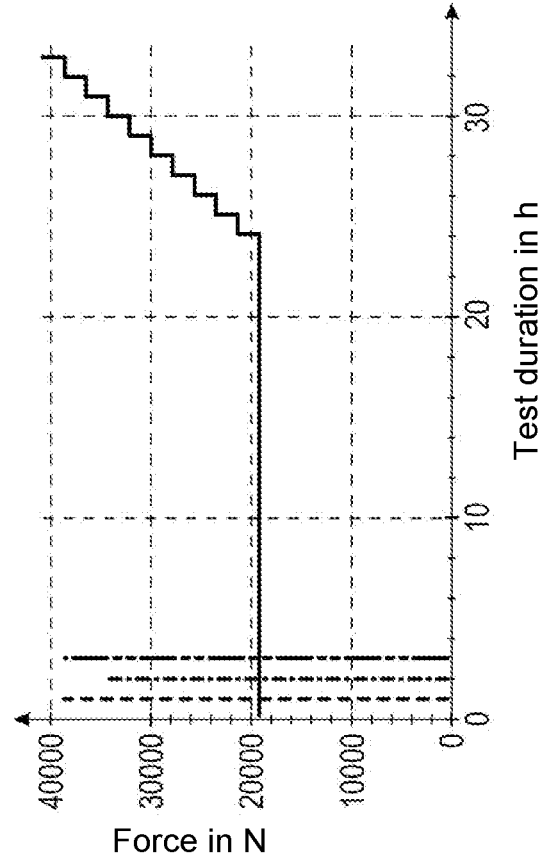
Figure 3B:
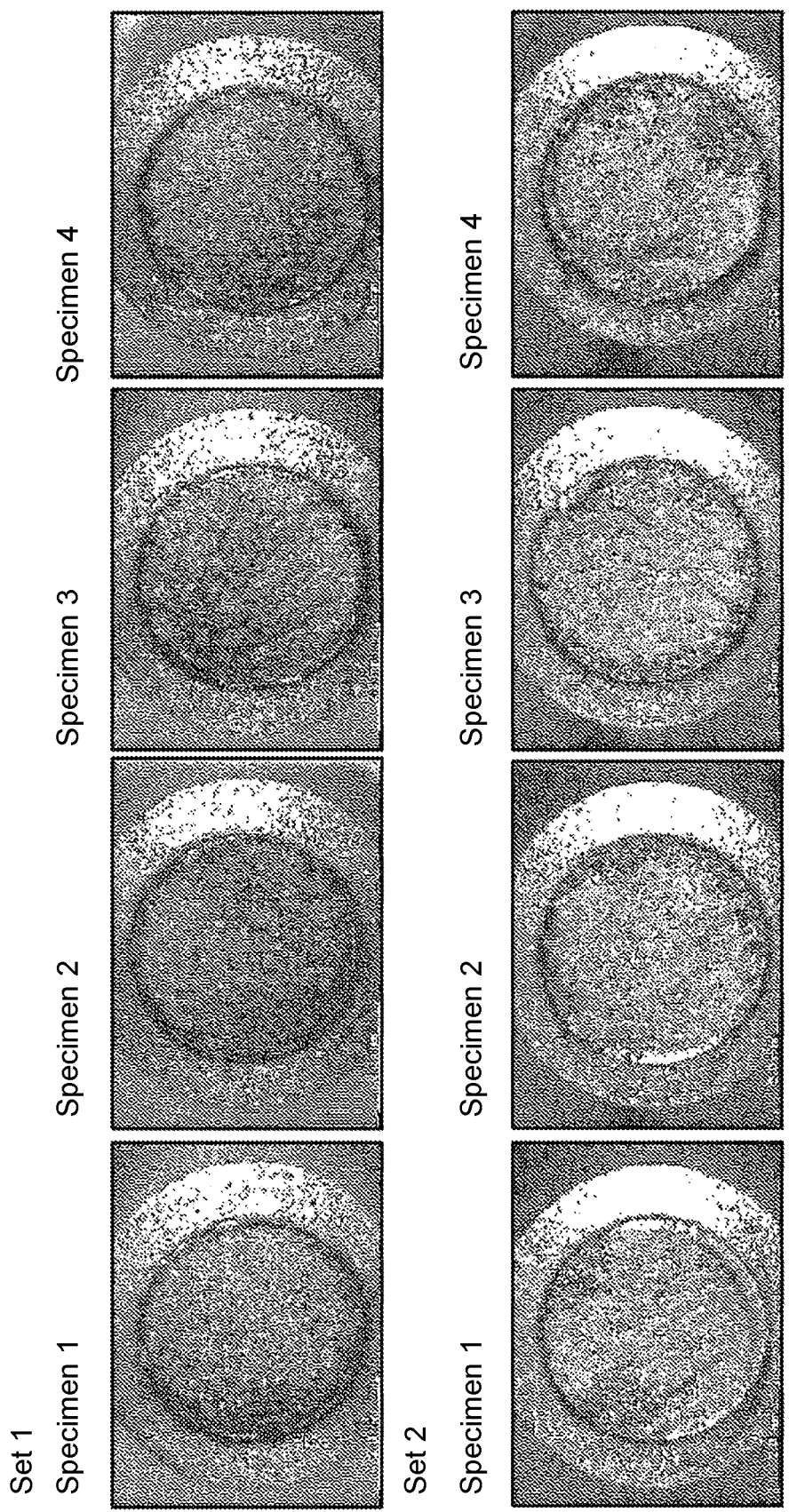
Figure 3C:
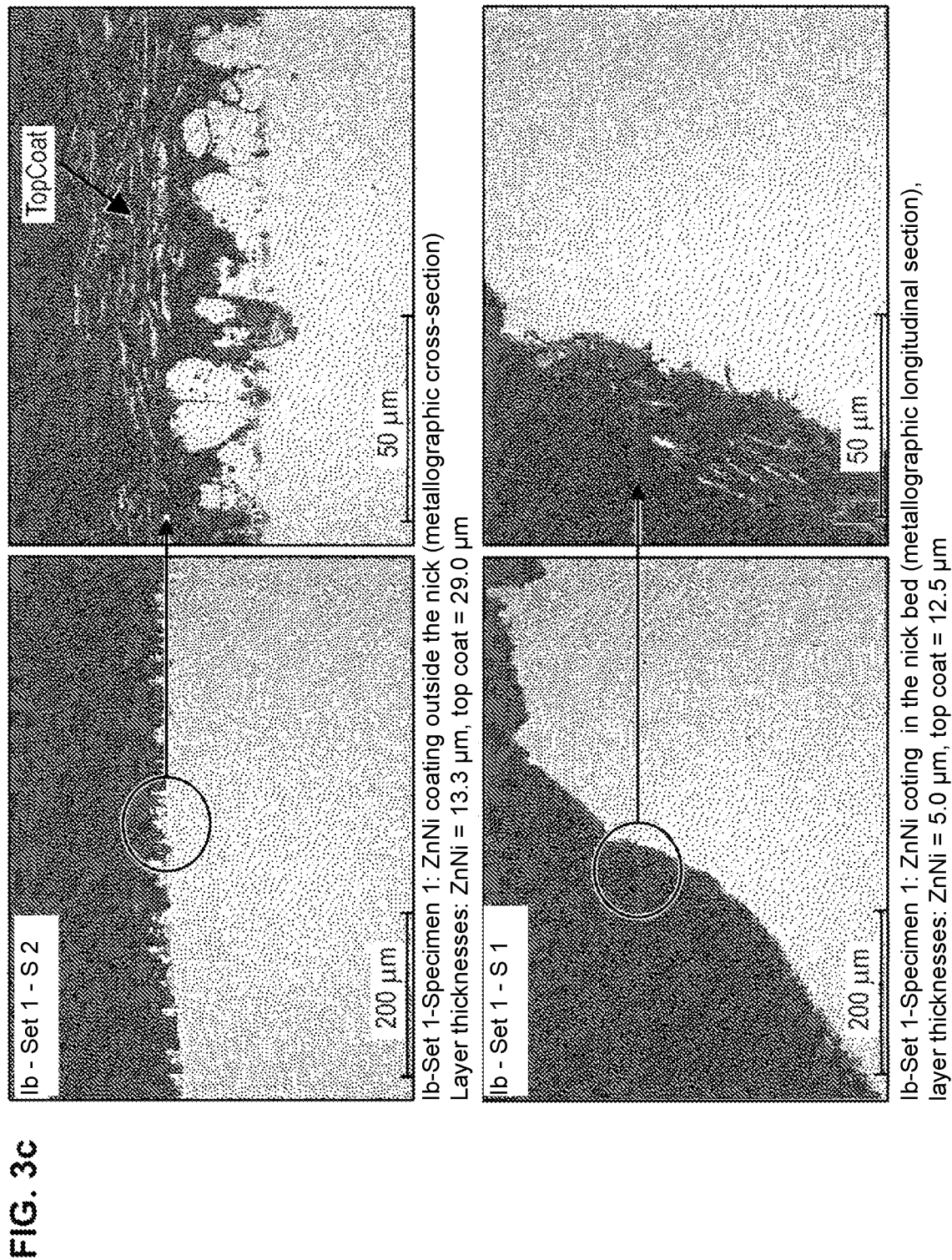
Figure 3D:
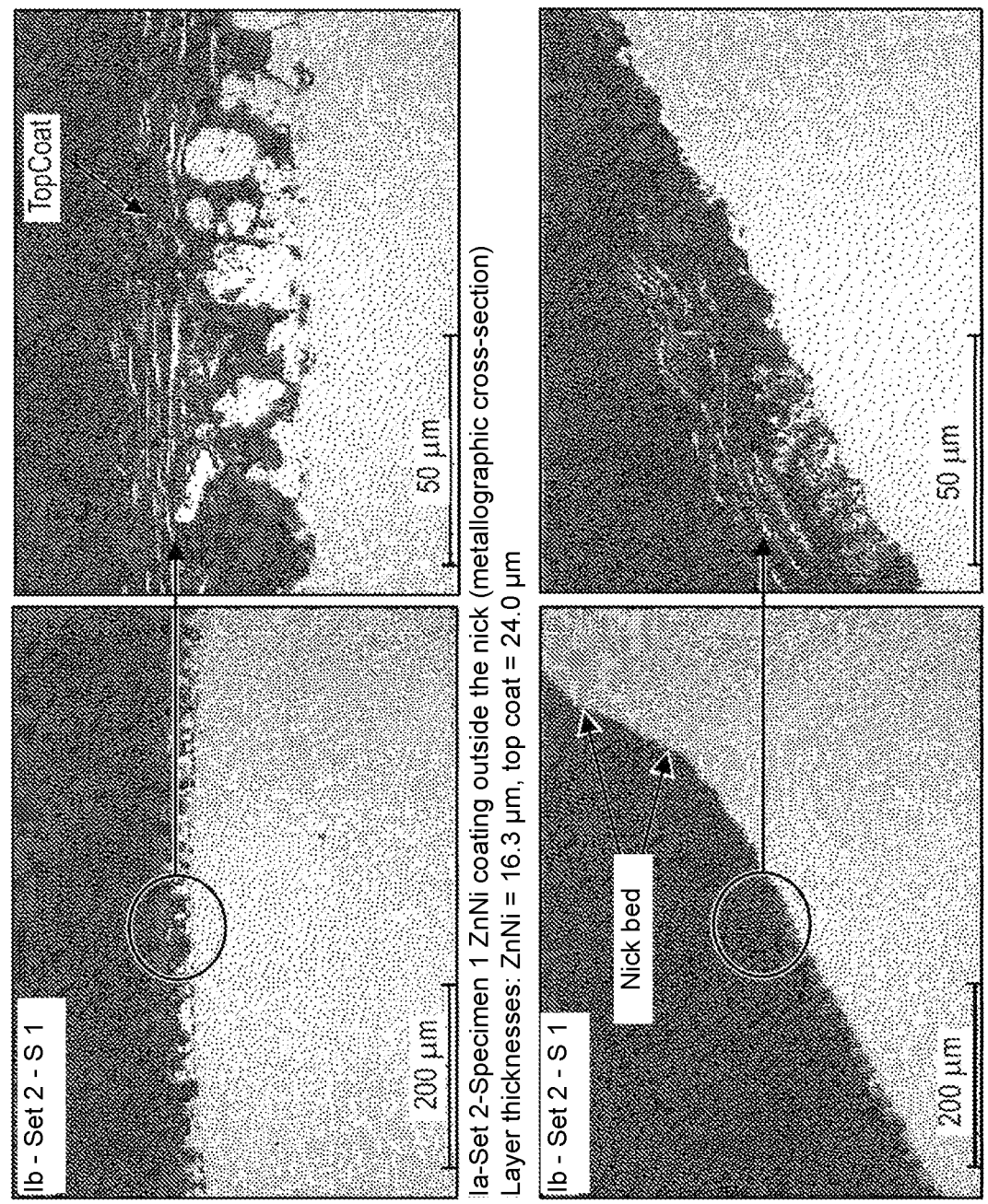

The metallographic analyses on specimen 1, set 1, show that the ZnNi coating has a thickness on average of 13.3 μm and the top coat has a thickness of 29.0 μm (FIG. 3c, upper illustrations). On specimen 1, set 2, the layer thicknesses amount on average to 16.3 μm with ZnNi and to 24.0 μm in the top coat (FIG. 3d, upper illustrations).

The tests furthermore show that the ZnNi coating at the tested sets 1 and 2 is differently pronounced in the region of the nick bed. Specimen 1, set 1 thus has both a ZnNi coating having a thickness of 5.0 μm and a top coat of 12.5 μm down to the nick bed (FIG. 3c, lower illustrations). Specimen 1, set 2, in contrast, only has traces of the ZnNi coating (FIG. 3d, lower illustrations). The top coat in this specimen is furthermore not continuously pronounced down to the nick bed.

Figure 3E:
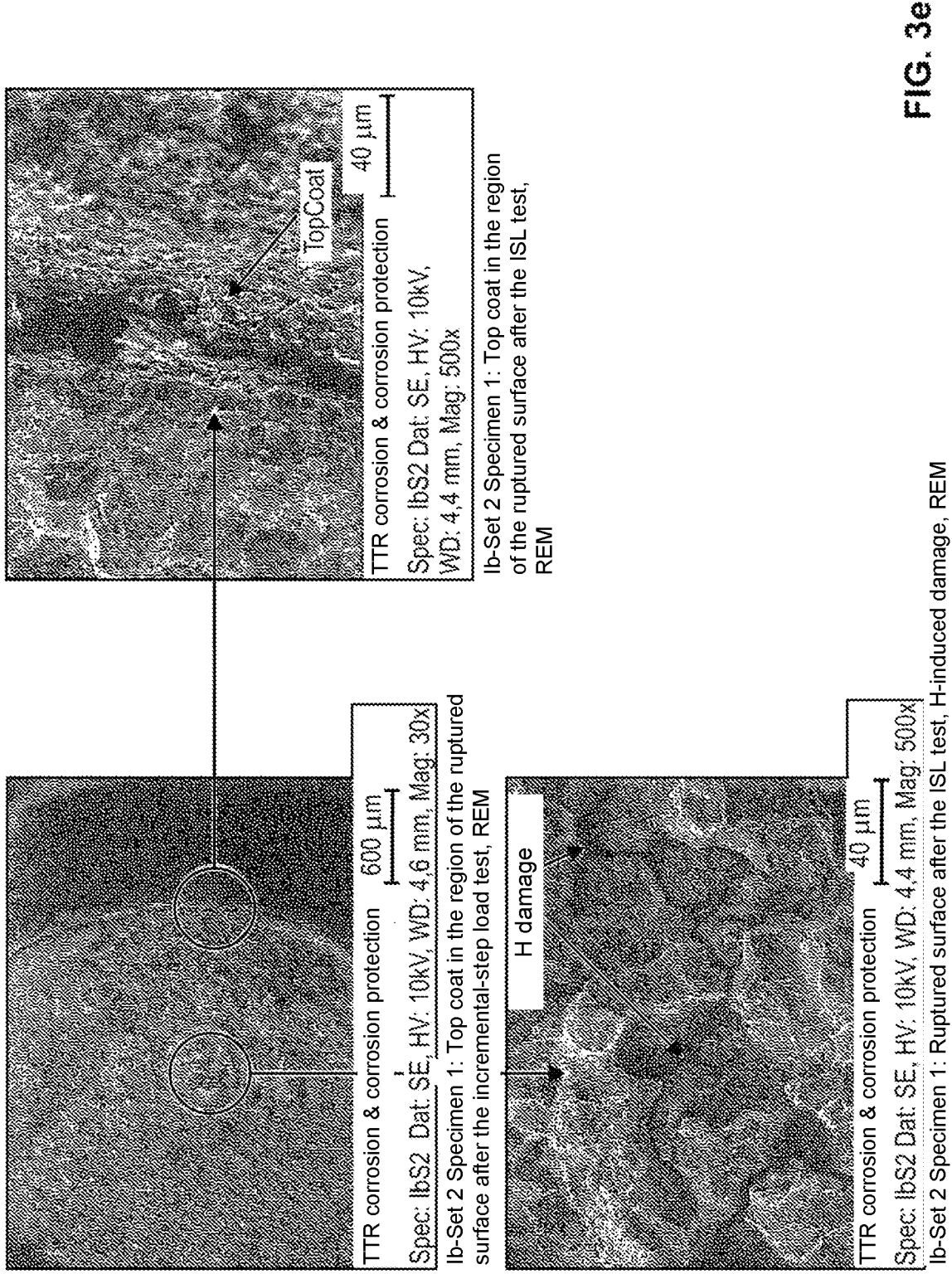

The scanning electron microscopic rupture-surface analysis of specimen 1 of the second step shows that it has considerable damage as a result of hydrogen embrittlement after the incremental-step load test (FIG. 3e, lower illustration). The top right illustration of FIG. 3e shows the top coat in the region of the nick bed.

The metallographic analyses on specimen 1, set 1, show that the ZnNi coating has a thickness on average of 13.3 μm and the top coat has a thickness of 29.0 μm (FIG. 3c, upper illustrations). On specimen 1, set 2, the layer thicknesses amount on average to 16.3 μm with ZnNi and to 24.0 μm in the top coat (FIG. 3d, upper illustrations).

The tests furthermore show that the ZnNi coating at the tested sets 1 and 2 is differently pronounced in the region of the nick bed. Specimen 1, set 1 thus has both a ZnNi coating having a thickness of 5.0 μm and a top coat of 12.5 μm down to the nick bed (FIG. 3c, lower illustrations). Specimen 1, set 2, in contrast, only has traces of the ZnNi coating (FIG. 3e, lower illustrations). The top coat is furthermore not continuously pronounced down to the nick bed.

The scanning electron microscopic rupture-surface analysis of specimen 1 of the second step shows that it has damage as a result of hydrogen embrittlement after the incremental-step load test (FIG. 3e, lower illustration). The upper illustration of FIG. 3e shows the top coat in the region of the nick bed.

Ic—LHE ZnNi (LLI)+Passivation+HT 190° C./23 h

In this series of experiments, a set of 4 nick-break specimens is prepared, wherein the coat applied to the steel here is not the multilayer coating in accordance with the invention.

A zinc-nickel layer, more precisely a layer of an LHE ZnNi (LLI), with a passivation is used as the coating for the steel of the type 300 M and is subjected to a heat treatment of 190° C. for a duration of 23 hours. This can be summarized as follows in brief: LHE ZnNi (LLI)+passivation+HT 190° C./23 h.

In this respect, no further coating is applied to the ZnNi layer. No second heat treatment takes place either.

A steel of the type 300 M, Lot 065/Z ($F_{mK}$=42960 N) is used as the material which serves as the substrate material for the coating.

The test parameters are as follows: 45% $F_{mK}$ 24 h+5% $F_{mK}$ per 1 h; max. 24+10 hours; test medium 3.5% NaCl, pH 7; test bench: Zwick Z050.

TABLE 4

Result of the test on specimen Ic

| Set | Specimen | Time to rupture in hours | Max. force in % $F_{mK}$/N | Result (>50% passed) | Remark |
|---|---|---|---|---|---|
| 1 | 1 | 26:10:12 | 55/25800 | passed | — |
| | 2 | 26:15:00 | 55/25800 | Passed | — |
| | 3 | 26:16:12 | 55/25800 | Passed | — |
| | 4 | 26:17:24 | 55/25800 | Passed | — |

The time-to-rupture diagram of specimen 1-4 is indicated in FIG. 4a.

Figure 4B:
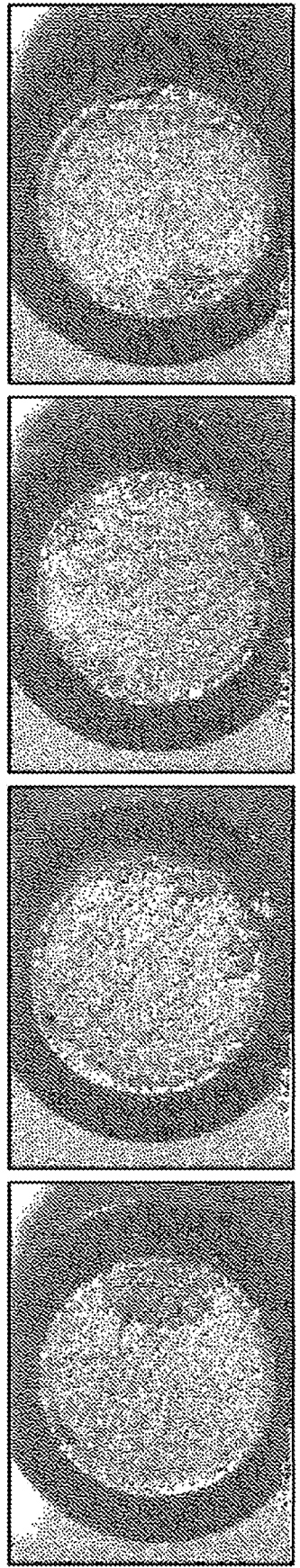

Furthermore, a microscopic representation of the ruptured surfaces of each specimen is shown in FIG. 4b.

The incremental-step load tests show that the examined specimens withstood a test load 55% $F_{mK}$. The shortest test duration amounts to 26 h 10 min 12 s.

Figure 4C:
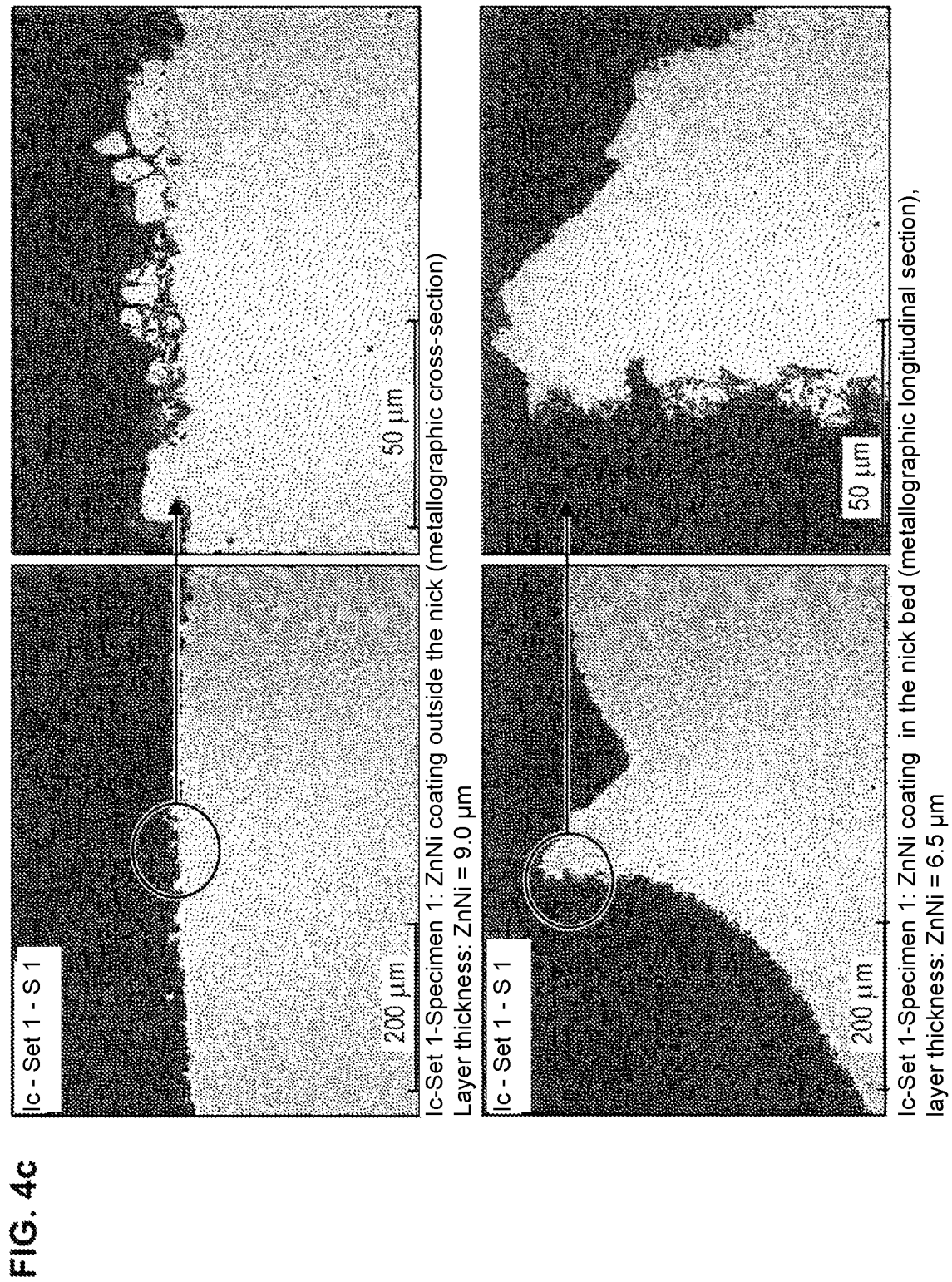

The metallographic analysis shows that the ZnNi coating is present down to the nick bed. The layer thickness of the ZnNi coating amounts to 9.0 μm on average and to 6.5 μm in the nick bed (FIG. 4c).

A summary of the results is presented in overview form in the following in Table 5.

TABLE 5

Summary of the results of the re-embrittlement test in table form

| Specimen designation | State | Set | No. | Max. force in % $F_{mK}$/N | Test duration h:min:s | Result (>50% passed) |
|---|---|---|---|---|---|---|
| Ia | LHE ZnNi (LLI) + | 1 | 1 | 90/40500 | 33:00:36 | Passed |
| | Passivation + | | 2 | 90/40500 | 33:01:12 | Passed |
| | HT 190° C./23 h + | | 3 | 90/40500 | 33:01:48 | Passed |
| | TC P35 (5 μm) + | | 4 | 90/40500 | 33:02:24 | Passed |
| | HT 190° C./30 min | 2 | 1 | 90/40800 | 33:00:36 | Passed |
| | | | 2 | 90/40800 | 33:01:12 | Passed |
| | | | 3 | 90/40800 | 33:01:48 | Passed |
| | | | 4 | 90/40800 | 33:01:48 | Passed |
| Ib | LHE ZnNi (LLI) + | 1 | 1 | 90/40600 | 33:00:36 | Passed |
| | Passivation + | | 2 | 90/40600 | 33:01:12 | Passed |
| | HT 190° C./23 h + | | 3 | 90/40600 | 33:01:48 | Passed |
| | TC P35 (10 μm) + | | 4 | 90/40600 | 33:02:24 | Passed |
| | HT 190° C./30 min | 2 | 1 | 55/25800 | 26:08:24 | Passed |
| | | | 2 | 55/25800 | 26:09:00 | Passed |
| | | | 3 | 55/25800 | 26:09:42 | Passed |
| | | | 4 | 55/25800 | 26:10:30 | Passed |
| Ic | LHE ZnNi (LLI) + | 1 | 1 | 55/25800 | 26:10:12 | Passed |
| | Passivation + | | 2 | 55/25800 | 26:15:00 | Passed |
| | HT 190° C./23 h | | 3 | 55/25800 | 26:16:12 | Passed |
| | | | 4 | 55/25800 | 26:17:24 | Passed |
| IIe | LHE ZnNi (LLI) + | 1 | 1 | 55/25800 | 26:07:48 | Passed |
| | Passivation + | | 2 | 55/25800 | 26:09:36 | Passed |
| | HT 190° C./23 h + | | 3 | 55/25800 | 26:17:24 | Passed |
| | HT accord. to LHT4-4103 | | 4 | 55/25800 | 26:27:00 | Passed |

It can be deduced from Table 5 that the multilayer coating in accordance with the invention has exceptional corrosion resistance which is superior to the comparison specimens, provided that the layer arrangement is formed as continuous and does not have a defect close to the nick bed of the nick-break specimen as in specimen Ib, set 2.

An overview of the layer thicknesses of the different specimens is shown in the following in table form.

TABLE 6

Summary of the layer thickness determination in table form

| | | | Layer thickness in µm | | | | |
| | | | Nick bed | | Jacket surface | | |
| Specimen designation | Set | No. | ZnNi MV* | TopCoat MV* | ZnNi MV** | TopCoat MV** | Comments |
|---|---|---|---|---|---|---|---|
| Ia | 2 | 2 | 8.5 | 20.5 | 16.0 | 33.0 | — |
| Ib | 1 | 1 | 5.0 | 12.5 | 13.3 | 29.0 | — |
| Ib | 2 | 1 | 0.0 | 0.0 | 16.3 | 24.0 | Hardly any ZnNi and no Top coat traceable in the nick bed |
| Ic | 1 | 1 | 6.5 | 0.0 | 9.0 | 0.0 | — |
| IIe | 1 | 1 | 7.5 | 0.0 | 18.7 | 47.0 | |

*Mean value from two measured values
**Mean value from three measured values

It can therefore be recognized that on a presence of a multilayer coating in accordance with the invention, the corrosion resistance is considerably increased with respect to conventional coatings. This is due to the reduced hydrogen embrittlement due to the multilayer coating in accordance with the invention.

What is claimed is:

1. A method of manufacturing an aircraft component with a multilayer coating, the method comprising:
   (1) applying a low hydrogen embrittlement ZnNi layer directly to a substrate material, wherein the substrate material is steel;
   (2) carrying out a first heat treatment in a temperature range from 135-300° C. for a time period of at least 23 hours;
   (3) passivating the low hydrogen embrittlement ZnNi layer;
   (4) applying a metal-pigmented top coat to the low hydrogen embrittlement ZnNi layer, wherein the top coat comprises a mixture of zinc flake layers and aluminum flake layers which are connected by an inorganic matrix; and
   (5) carrying out a second heat treatment in a temperature range of between 180 and 200° C. for a time period of at least 10 minutes.

2. The method in accordance with claim 1, wherein the first heat treatment temperature range is from 185-220° C.

3. The method in accordance with claim 1, wherein the substrate material is shot peened with an intensity of at most 0.1 mm Almen A before step (1).

* * * * *